April 11, 1950  M. H. MURRAY  2,503,449
AUTOMOBILE SWITCH STRUCTURE
Filed March 1, 1948

INVENTOR.
Marshall H. Murray
BY
ATTORNEY.

Patented Apr. 11, 1950

2,503,449

UNITED STATES PATENT OFFICE 2,503,449

AUTOMOBILE SWITCH STRUCTURE

Marshall H. Murray, Kansas City, Mo.

Application March 1, 1948, Serial No. 12,431

2 Claims. (Cl. 180—82)

This invention relates to accessories for automobiles or the like and more particularly to switch structure interposed within the electric ignition system of said automobile and operable from a moving part of the automobile as the same travels to automatically deenergize said circuit when the owner sets the same to so operate.

The primary object of this invention is the provision of switch structure for automobiles having a swingable device for making and breaking connections of the ignition circuit and provided with means actuated by a moving part of such automobile when the same is caused to travel for moving such swingable device to a circuit breaking position when the structure is manually preset by the automobile owner.

A further object of this invention is the provision of switch structure for automobiles having as a component part thereof, a special type of circuit make and break mechanism capable of automatically deenergizing the ignition system of the automobile in the event the latter is involved in an accident and turns over on either of its sides.

Other objects of this invention lie in the particular manner in which the operative parts thereof may be moved into and out of an operative position; the way in which the circuit make and break mechanism remains in a circuit breaking position after the same has been moved thereto by certain movable parts of the automobile even after such parts continue to move; the way in which the operator may determine when the manual manipulable parts thereof are in a position ready for actuation; and many other details of construction which will appear during the course of the following specification.

The device about to be described includes a frame having a number of plates 10, 12 and 14 respectively. These plates are interconnected by a plurality of bolts or the like 16, having threaded thereon spacers 18 for holding the plates 10, 12 and 14 in spaced relationship, all as indicated in Fig. 3.

Figure 1:
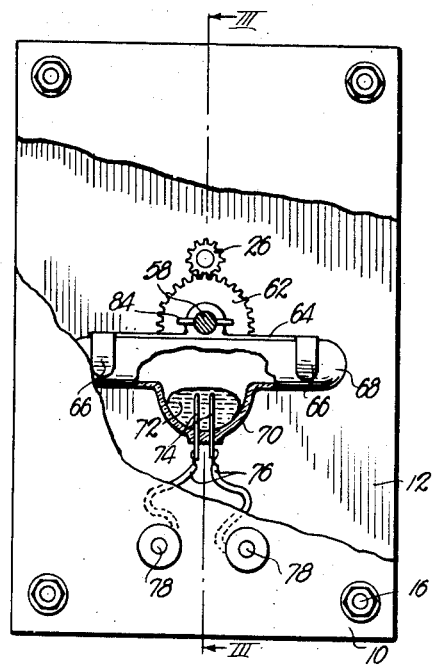
Fig. 1 is a front elevational view of an automobile switch structure made in accordance with the present invention, parts being broken away and in section to reveal details of construction.
Figure 3:
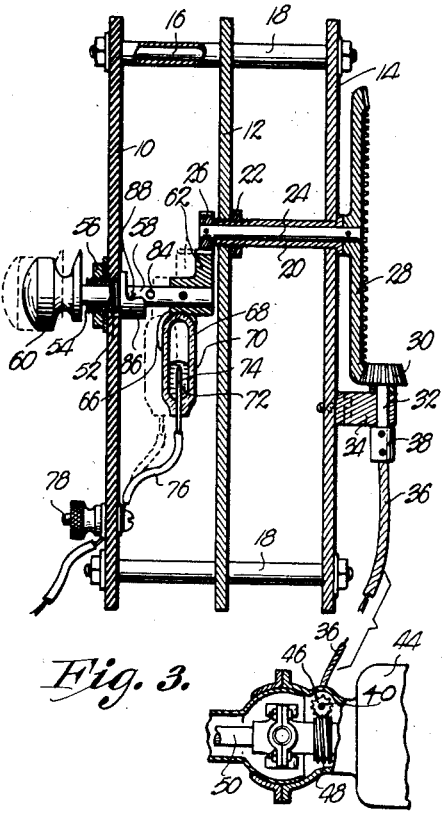
Fig. 3 is a substantially central vertical cross-sectional view taken on line III—III of Fig. 1.
Figure 2:
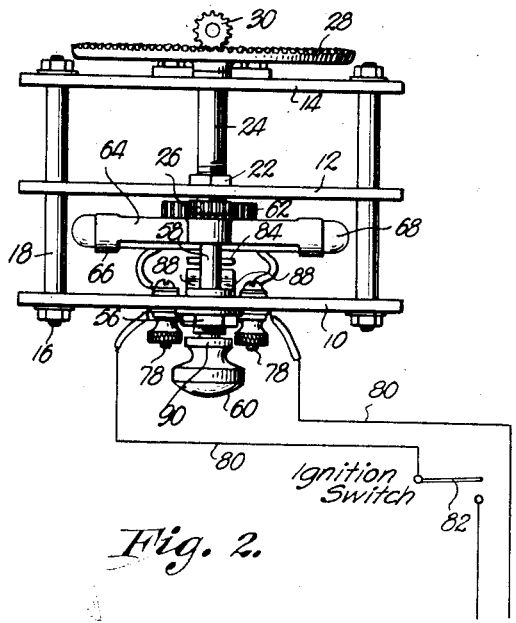
Fig. 2 is a top plan view thereof illustrating schematically the manner in which the structure is interposed in the automobile ignition system.
Figure 4:
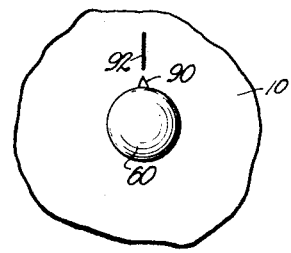
Fig. 4 is a a fragmentary front elevational view showing the manual manipulable knob.

A sleeve 20 disposed within aligned openings in plates 12 and 14 interconnects these plates and is threadably secured in plate 12 as clearly indicated in Fig. 3. A lock nut 22 holds the sleeve 20 in space spanning the distance between plates 12 and 14. This sleeve 20 rotatably supports a short shaft 24 having a small gear 26 rigidly secured to one end thereof and disposed between the plates 10 and 12. The opposite end of this shaft 24 has mounted thereon a ring gear 28. A pinion 30 is disposed in meshing relationship with the ring gear 28 and is mounted upon a stub shaft 32 journaled in a bearing 34 mounted directly upon the plate 14. This stub shaft 32 is connected to a flexible shaft 36 by means of a coupling 38. The flexible shaft 36 is joined to a short shaft 40 journaled in a housing forming a part of the automobile with which this structure is to be used, such as the transmission housing therefor indicated by the numeral 44. The shaft 40 has rigidly secured thereto at one end thereof opposite to its connection with the flexible shaft 36, a small pinion 46. This pinion 46 is in mesh with a worm gear 48 secured directly to the driven shaft 50 of the automobile.

The plate 10 has a tapped opening 52 formed therein for receiving a tubular member 54 provided with external threads as indicated in Fig. 3. This tubular member 54 is held in place by a lock nut 56. A rod 58 telescoped within the tubular member 54 for free rotating and reciprocable movement therein, carries a manually manipulable knob 60.

This knob 60 is rigidly secured to the rod 58 at one end thereof adjacent the outermost face of plate 10. A substantially half-circular gear 62 is secured directly to the rod 58 adjacent the innermost end thereof, this gear being disposed between the plates 10 and 12 of the supporting framework. A bracket 64 welded or otherwise affixed to the gear 62 has pairs of spaced apart normally down-turned legs 66 for receiving a hollow body 68. The bracket 64 is preferably made from resilient material to the end that the body 68 is yieldably and removably supported by the legs 66 of bracket 64. The body 68 is hollow and substantially T-shaped, the stem portion 70 thereof containing a quantity of conducting liquid 72 such as mercury.

A pair of circuit connections or conductors 74 extend into the stem portion 70 of body 68 and into this mercury 72. These two conductors 74 are connected by means of a pair of wires 76 to connecting posts 78 mounted upon the plate 10 near the lowermost edge thereof. These connecting posts 78 extend through plate 10 to the outermost face thereof for receiving a pair of wires 80. These wires 80 form a part of the electric circuit of the automobile ignition system, one of which has the ignition switch 82 interposed therein. It is clear therefore, that when the mercury switch including body 68 and conducting posts 74, is in the normal position illustrated in the drawing with mercury 72 thereof electrically interconnecting posts 74, the ignition circuit will be connected as soon as switch 82 is closed. In the event however, that the automobile with which the structure forming the subject matter of this invention is used, is involved in an accident and turns over on either of its sides, the mercury 72 will flow from the stem portion 70 of body 68 into either of the hollow legs of body 68 breaking the connection between conducting posts 74. When such event occurs therefore, the ignition circuit of the automobile will immediately become deenergized even though ignition switch 82 remains closed, and the fire hazard usually present with such accidents, is automatically eliminated.

The rod 58 has a cross pin 84 secured thereto intermediate its ends and specifically adjacent the semi-circular gear 62. This cross pin 84 is eccentrically disposed in the rod 58 and is received by a cam portion 86 of the member 54 when the rod 58 is pulled outwardly by the operator grasping knob 60. This cam portion 86 of member 54 is partially semi-circular thereby encircling only a part of the rod 58 and has a pair of offset notches 88 for receiving the cross pin 84. When the rod 58 is moved to the outermost end of its path of travel, the cross pin 84 is moved into the groove 88 of cam portion 86 and rod 58 thereby yieldably held in the inoperative position. By the same token, when rod 58 is moved inwardly, the cam 86 will yieldably hold the same in the operative position.

It is apparent that a rather loose fit between rod 58 and the member 54 is necessary to the end that pin 84 will readily move into the notch or groove 88.

The knob 60 has a pointer 90 formed thereon and plate 10 is provided with an indicating mark 92. Thus the operator will always know the position of gear 62 because of the pointer 90 and indicating mark 92 and further, because of the fact that pin 84 cannot be moved into the groove 88 if the gear 62 is not in the position illustrated in the drawing with body 68 depending therefrom.

In normal operation, the gear 62, body 68, rod 58 and knob 60 are in the position illustrated by dotted lines in Fig. 3 and held in such position by the pin 84 being disposed within the groove 88. When the operator leaves his automobile, he simply pushes inwardly upon the knob 60 to move gear 62 into meshing relationship with the small gear 26 on shaft 24. The body 68 moves inwardly toward the plate 12 when the device is so set, the wires 76 being sufficiently long to permit such movement of body 68. In the event a thief attempts to steal the automobile in the owner's absence by closing ignition switch 82 in any manner as by a special key or closes the ignition circuit by any means within common knowledge of such thieves, the automobile can be moved but as soon as travel begins, the drive shaft 50 will rotate to drive pinion 46, shaft 40, flexible shaft 36 and meshing gears 30 and 28. This will cause rotation of shaft 24 and gear 26 and thereby rotate the semi-circular gear 62. Since the body 68 is connected to gear 62, it will also be swung through an arc causing the mercury 72 to move from the stem portion 70 of body 68. Such movement of the liquid 72 will immediately deenergize the ignition circuit, causing the automobile to stop. Since the automobile will continue to move a distance by momentum and drive shaft 50 will continue to rotate, clearance is provided between the gear 62 and bracket 64. Gear 62 will then move out of meshing engagement with the gear 26 and this latter gear will rotate on the normally lowermost flat surface of gear 62. During such action, the body 68 will remain in the position just described with the fluid 72 in one of the hollow ends of body 68. When the operator recovers his automobile, he simply pulls outwardly on the knob 60 whereby the body 68 will move to its normal position by force of gravity where the pointer 90 is in alignment with the mark 92 and the pin 84 can then be moved into the groove 88.

The device may be mounted at any accessible point adjacent the automobile dashboard and if desired, may be positioned out of normal view of the thief. In the event that such thief has knowledge of such devices as forms the subject matter of this invention, he will not have time to search the automobile to determine its position after the same stops because of the operation of such structure.

It is apparent from the foregoing that there has been presented herein a device that performs not only the function of preventing automobile theft but also is capable of automatically de-energizing the entire electrical system of the automobile in the event an accident should occur.

The structure is relatively simple to manufacture, may be easily installed in an automobile and is easy to operate. Manifestly, many details of construction may be changed and modified without departing from the spirit of this invention as defined by the scope of the claims appended hereto.

Having thus described the invention, what is claimed as new and desired to be secured by Letters Patent is:

1. In an automobile having parts movable as the automobile travels and an ignition system provided with an electric circuit; a receptacle adapted for tiltable mounting on said automobile and capable of containing a liquid conductor; a pair of spaced terminals extending into said liquid, said terminals being coupled in said circuit to maintain the latter de-energized when the terminals are in an electrically-disconnected condition, said receptacle having chambers formed therein to receive the liquid as the same flows from the terminals in response to a tipping of the automobile in any of a number of directions from normal, whereby the circuit is de-energized while the automobile is in the tipped condition; rotatable structure operably connected with said parts; and apparatus on said receptacle movable to and from a position joined with said structure for tilting the receptacle to cause said liquid to flow from said terminals, whereby the circuit is de-energized upon movement of the automobile.

2. In an automobile having parts movable as the automobile travels and an ignition system provided with an electric circuit; a rotatable shaft; a receptacle on the shaft adapted to contain a liquid conductor; a gear secured to the shaft; a second rotatable gear operably connected with said parts; and a pair of spaced terminals on the receptacle and extending into said liquid, said terminals being coupled in the circuit to hold the latter de-energized when the terminals are electrically disconnected, said shaft being reciprocably mounted for movement of the gear thereon to and from a position in mesh with said second gear, whereby upon travel of the automobile, movement of said parts and rotation of the gears, the receptacle will be rotated to cause the liquid to flow from the terminals and thereby de-energize the circuit.

MARSHALL H. MURRAY.

REFERENCES CITED

The following references are of record in the file of this patent:

UNITED STATES PATENTS

| Number | Name | Date |
| --- | --- | --- |
| 1,569,223 | Gore | Jan. 12, 1926 |
| 1,640,695 | Dolly | Aug. 30, 1927 |
| 1,730,526 | Pancoast | Oct. 8, 1929 |
| 2,155,758 | Hinde | Apr. 25, 1939 |
| 2,192,262 | Griesedieck | Mar. 5, 1940 |